United States Patent
Lyall, III et al.

(10) Patent No.: US 8,991,302 B2
(45) Date of Patent: Mar. 31, 2015

(54) BREW BASKET WITH SPLASH RESERVOIR

(75) Inventors: Lucian Hite Lyall, III, Rancho Santa Margarita, CA (US); Christopher Milner Enright, Ladera Ranch, CA (US)

(73) Assignee: Wilbur Curtis Company, Montebello, CA (US)

( * ) Notice: Subject to any disclaimer, the term of this patent is extended or adjusted under 35 U.S.C. 154(b) by 876 days.

(21) Appl. No.: 12/877,702

(22) Filed: Sep. 8, 2010

(65) Prior Publication Data

US 2012/0055344 A1 Mar. 8, 2012

(51) Int. Cl.
*A47J 31/00* (2006.01)
*A47J 31/44* (2006.01)
*A47J 31/057* (2006.01)
*A47J 31/02* (2006.01)
*A47J 31/053* (2006.01)
*A47G 19/14* (2006.01)
*A47J 31/58* (2006.01)
*A47J 31/06* (2006.01)

(52) U.S. Cl.
CPC . *A47J 31/58* (2013.01); *A47J 31/06* (2013.01)
USPC .............. 99/279; 99/304; 99/306; 99/311; 99/323

(58) Field of Classification Search
USPC .......... 99/323, 279, 316, 295, 300, 304–314; 210/238, 248, 455
See application file for complete search history.

(56) References Cited

U.S. PATENT DOCUMENTS

| | | | | |
|---|---|---|---|---|
| 1,447,813 A | * | 3/1923 | Patrick | 99/425 |
| 3,068,777 A | * | 12/1962 | Pedalino | 99/305 |
| 4,352,324 A | * | 10/1982 | Noh | 99/425 |
| RE34,473 E | * | 12/1993 | Ryan et al. | 99/307 |
| 5,287,797 A | * | 2/1994 | Grykiewicz et al. | 99/295 |
| 5,910,205 A | * | 6/1999 | Patel | 99/315 |
| 6,055,900 A | * | 5/2000 | Bunn | 99/279 |
| 6,487,961 B2 | * | 12/2002 | Bunn | 99/323 |
| 6,497,818 B1 | * | 12/2002 | Bunn | 210/238 |
| 6,571,686 B1 | * | 6/2003 | Riley et al. | 99/299 |
| 6,827,004 B2 | * | 12/2004 | Hammad et al. | 99/315 |
| 2002/0100370 A1 | * | 8/2002 | Bunn | 99/323 |
| 2006/0042471 A1 | * | 3/2006 | Butt | 99/292 |
| 2010/0040749 A1 | * | 2/2010 | Lassota | 426/433 |
| 2010/0199852 A1 | * | 8/2010 | Webster et al. | 99/306 |

* cited by examiner

*Primary Examiner* — Henry Yuen
*Assistant Examiner* — Hemant Mathew
(74) *Attorney, Agent, or Firm* — Fulwider Patton LLP

(57) ABSTRACT

A brew basket for a brewing apparatus includes a splash protection structure to protect against spilling when the brew basket is removed prematurely with hot brewing liquid therein. The structure is a splash reservoir formed near the handle of the brew basket, extending the interior surface of the brew basket radially outward at the site of the compartment where the basket is pulled out of the brewing apparatus. A well or reservoir attenuates a wave of liquid created by pulling the basket out by directing the wave to the reservoir rather than impact the side wall of the basket, where hot liquid would then tend to splash or spill out.

5 Claims, 3 Drawing Sheets

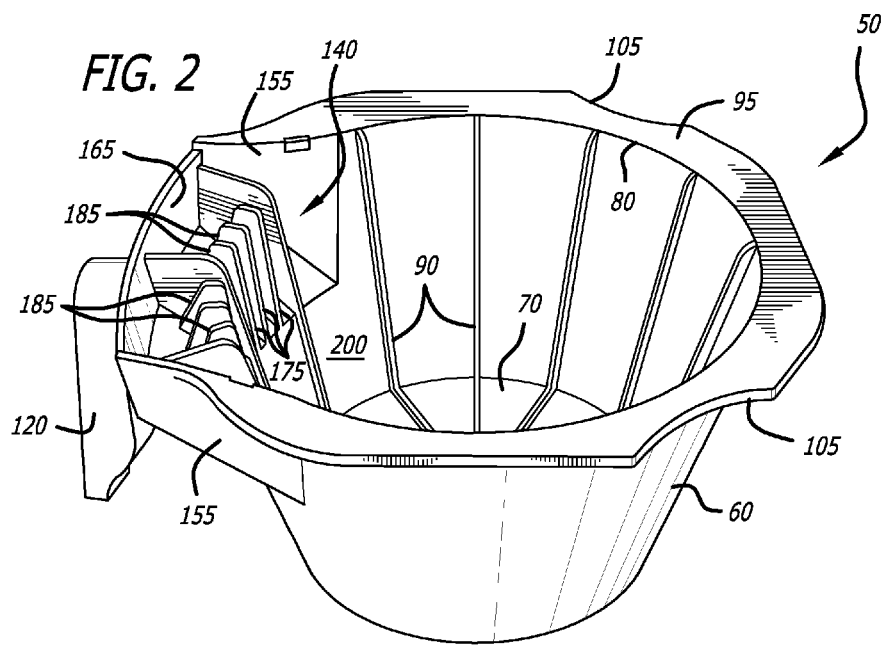
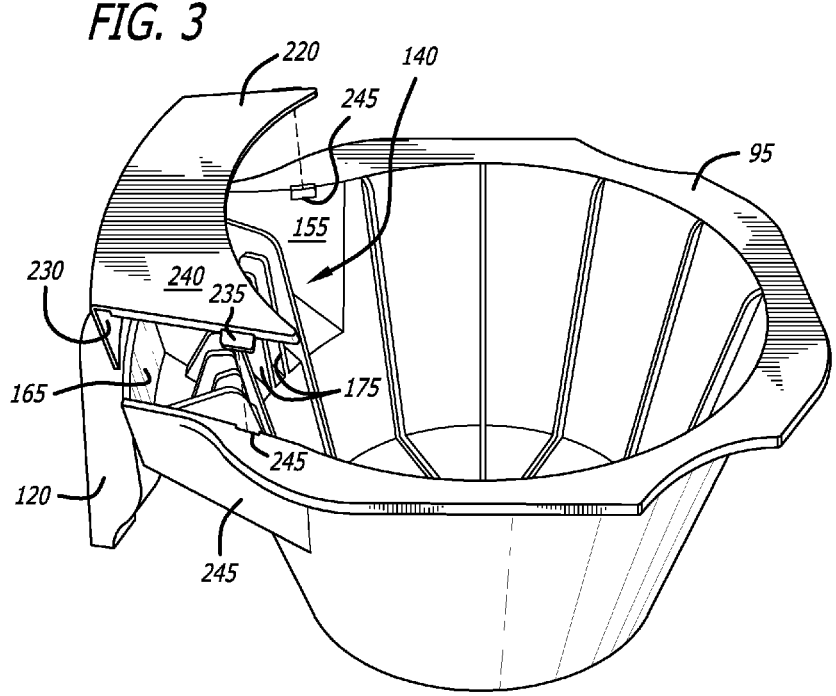

BREW BASKET WITH SPLASH RESERVOIR

BACKGROUND

The present invention relates generally to coffee brewing equipment, and more particularly to a coffee brew basket with a splash receptacle that prevents hot liquid from contacting a user when the basket is removed during a brew cycle.

Coffee brewing equipment for commercial establishments such as restaurants, hotels, banquet halls, and the like use heavy duty coffee makers that can brew large quantities of coffee, tea, or other beverages in a single brewing operation. The fundamentals of these brewing equipment are well know. A source of water is supplied to the brewing equipment, either heated or the brewing equipment has a heating element to bring the water to a suitable temperature. The hot water is then introduced to a brewing compartment where coffee in a ground state is held in a filter that allows liquids but not the solid grounds to pass. The water infuses with the coffee grounds, and releases the oils and flavors of the grounds to make coffee. The coffee seeps through the filter and out a drain in the basket to a canister, serving container, or holding tank for retrieval to a serving container. When the brewing cycle is complete, the grounds in the basket and the filter are replaced with fresh grounds and a new filter, and the process can be started again.

In large restaurants and hotels, at peak hours such as breakfast, dinner, meetings, etc., the process is continuous and as soon as one brewing cycle ends another begins. Kitchens in hotels and restaurants tend to have a lot of inexperienced workers in them due to high turnover and relatively low pay scales, and training can be challenging to maintain. It is problematic when dealing with electrical equipment and water heated to dangerously high temperatures. One hazard that has arisen is where a worker removes the brew basket prematurely during a brew cycle containing heated water. A basket full of hot water, when pulled out of the brewing equipment, will cause a wave of hot water to rush against the basket wall near the worker, leading to scalding water hitting the wall and splashing over the wall's upper edge. This can cause serious burning to the worker, where the handle is located at the position where the heated water is most likely to spill.

Several prior art brew baskets have attempted to solve this problem, including U.S. Pat. Nos. 6,497,818, 6,487,961, and 6,055,900, each of which are incorporated by reference herein in their entireties. However, there are shortcomings associated with each of these devices that are overcome by the present invention.

SUMMARY OF THE INVENTION

The present invention is directed to the problem of splashing of heated water due to a premature removal of the brew basket of a brewing apparatus during a brew cycle. The brew basket of the present invention is formed with a reservoir jutting from the upper surface to capture a wave of heated brewing water before it can contact the wall of the brew basket and splash over the edge and injure a worker. The reservoir preferably includes radial fins that help collect and trap the wave in the channels formed therebetween. The reservoir in a preferred embodiment gradually shallows as it extends radially outward to absorb and dissipate some of the energy of the wave against the lower wall of the reservoir. A secondary benefit of the reservoir is that it provides a convenient attachment location for an indicator/clip that can designate the type of coffer such as "regular," decaffeinated," "flavored," and so forth. These and other benefits of the present invention will be appreciated in view of the drawings and the following detailed description.

BRIEF DESCRIPTION OF THE DRAWINGS

FIG. 2 is an elevated, perspective view of the brew basket of the present invention without the overlay;

FIG. 3 is an elevated, perspective view of the brew basket of the present invention with the overlay;

DETAILED DESCRIPTION OF THE PREFERRED EMBODIMENTS

The present invention is directed to an improved brew basket that will resist splashing and spilling hot beverage on a user when the basket is prematurely pulled out of a brewing apparatus before it had properly drained. Brewing apparatus such as those manufactured and sold by the assignee of the present invention, Wilbur Curtis Company of Montebello, Calif., and other manufacturers of commercial and person use are well known in the art, and their description and operation are omitted here for brevity. However, for completion the disclosures of U.S. Pat. Nos. 7,717,026, 7,509,908, and 7,234,389 are each incorporated herein by reference in their entireties.

Brewing apparatus typically include a brew basket that holds ground coffee beans and a filter. The basket comprises a cylindrical or rectangular wall that cooperates with a bottom wall to define a volume of the brew basket. The cylindrical wall is sized to hold a coffee filter and a quantity of ground coffee, as well as a volume of heated water needed to brew the coffee. The basket is typically formed with a circumferential lip that extends outwardly from the top of the cylindrical wall, and where the lip is slid into a slot in the brewing apparatus to ensure correct placement of the basket, i.e., so as to seat the brew basket beneath the source of heated water, and so the basket's drain is positioned over the entrance to the canister or beverage decanter. Brew baskets are normally made of a hard plastic that can accommodate the water temperatures used to brew coffee, and include a handle integrally formed from the top of the basket. Baskets also have internal ribs extending radially outward from the drain that allow the filter to sit on the ribs while hot water occupies the spaces between the ribs, so the filter will not float but will soak up some of the water and promote more complete brewing. As water enters the filter occupied by ground coffee it passes through the filter and exits the drain into the decanter or storage vessel where it can be dispensed into serving containers or individual cups. The filter traps the grounds so that they do not pass through the drain and contaminate the beverage.

Figure 1:
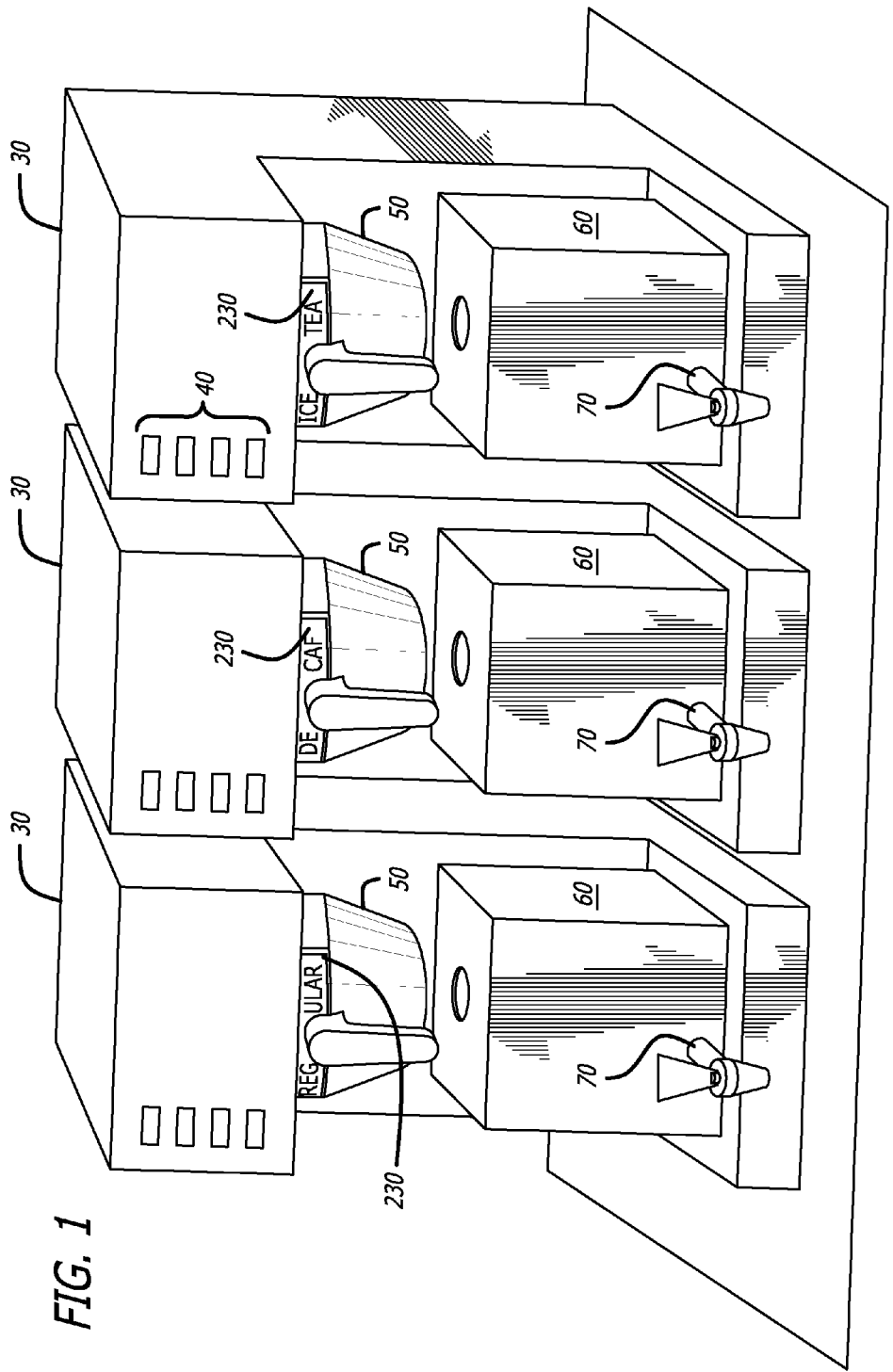
FIG. 1 illustrates a plurality of brewing apparatus using a brew basket of the present invention.

FIG. 1 illustrates a series of sample brewing apparatus 30 that may be used with the present invention. The brewing apparatus include a housing coupled to a water supply (not shown), a heating element (not shown) for heating the water, and a serving container 60 for holding and dispensing the brewed beverage through a spigot 70. A series of indicators and/or controls 40 serve to regulate the brewing operation. The brewing apparatus 30 incorporates a brew basket 50 that will normally contain a filter (not shown) and a quantity of ground coffee used for brewing the beverage.

The basket 50 of the invention is shown in FIG. 2, and shows generally basket wall 60 defining the brewing compartment, along with a floor panel 70. The wall's upper edge 80 includes a peripheral lip 95 that extends radially outward to support the basket 50 when its inserted into the brewing apparatus 30. The basket 50 also includes ribs 90 that extend radially outward from the drain 100 along the inner surface of the floor panel 70 to the wall 60, and then up the wall's surface to the peripheral lip 95. The ribs 90 are spaced approximately thirty degrees apart, totaling twelve ribs in all. Other numbers of ribs are possible as well. In one embodiment of the brew basket, the height of the basket from the bottom of the drain 100 to the top of the lip 95 is approximately five and three quarter inches, and the mean radius along the top of the wall is about two and a quarter inches. The peripheral lip 95 may have a scalloped contour 105 to aid in the insertion of the basket 50 into the brewing apparatus' slot. The bottom 70 of the basket may include a number of spacers 115 or supports that allow the basket 50 to be seated on a portion of the brewing apparatus 30 in some embodiments and relieve some or all of the weight of the basket on the lip 95. The wall 60 forms a frusto-conical section, such that the surface area at the top of the basket is larger than the surface area at the bottom of the basket. The handle 120 may be integrally formed as part of a single-unit construction that can be molded from a single mold. This advances the goal of being both cost effective and adds strength and durability to the basket 50 while ensuring that all the mating surfaces have a fluid tight seal.

Figure 4:
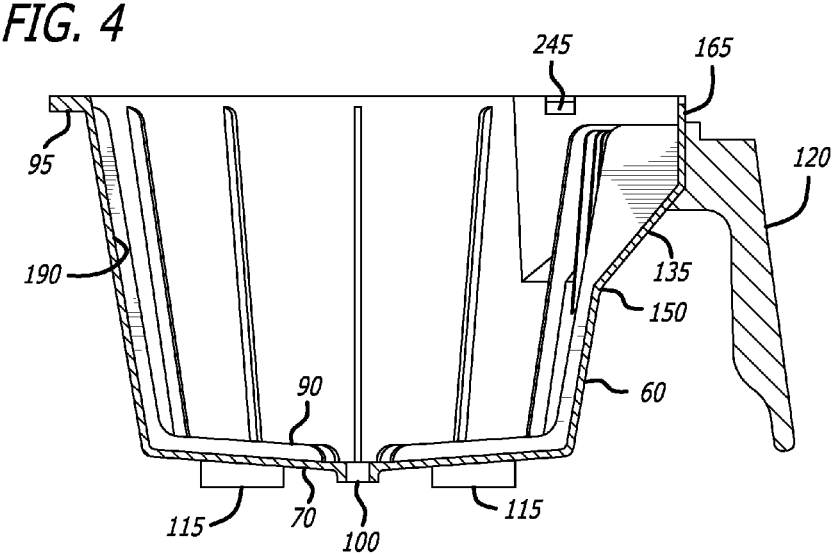
FIG. 4 is a cross sectional view of the brew basket of FIG. 2.
Figure 5:
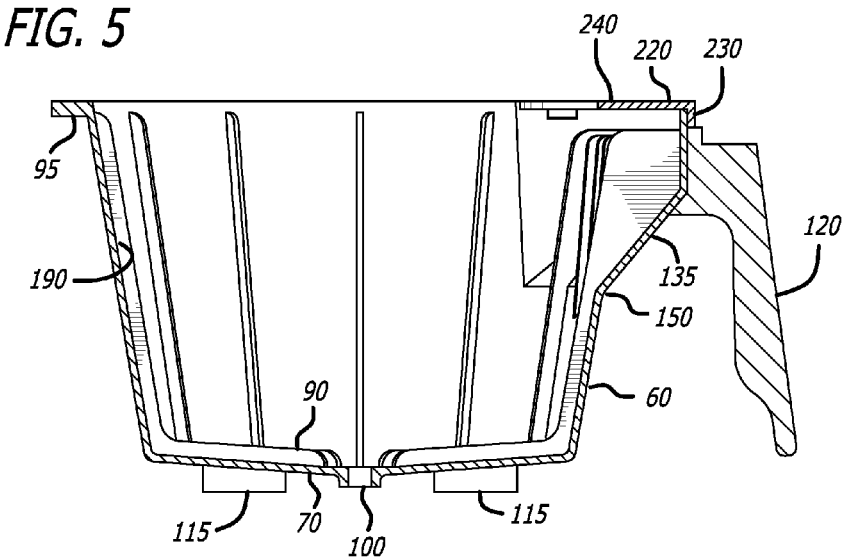
FIG. 5 is a cross sectional view of the brew basket of FIG. 5.

While the bottom portion of the wall 60 is continuous and generally cylindrically shaped, in the present invention about half way up (or approximately two and a half inches) an extension panel 135 juts out and up radially out from the wall 60 (see FIGS. 4, 5). The extension panel 135 defines the bottom of a reservoir 140 that is part of an expansion of the normal brew basket volume, referred to herein as the splash reservoir. The extension panel 135 can be horizontal, but preferably slants upward from the juncture 150 with the cylindrical wall. The extension panel 135 mates with two side panels 155 that also extend outward from the brew basket wall, and may be either parallel or slightly slanted inward toward each other. A front face or edge 165 mates with the side panels 155 and the extension panel 135 to form a compartment whose inner surfaces define part of a contiguous volume that adjoins the main volume of the brew basket (see FIG. 2), but extends the volume of the brew basket 50 outside an ordinary boundary of the basket compared with a volume without the splash reservoir.

The splash reservoir 140 is preferably formed with a series of vertical fins 175 extending radially inward from the inner surface of the extension panel 135 to form narrow channels 185. As will be explained more fully below, these channels 185 help to attenuate any wave of fluid entering the splash reservoir 140 by dividing a larger wave into six to eight smaller waves. The fins 175 may extend the length of the splash reservoir 140 but preferably not farther so as not to interfere with the positioning of the filter (not shown). The fins 175 can be separated by an arc of approximately eight degrees and are equally spaced throughout the splash reservoir 140.

If the brew basket 50 is removed from the brewing apparatus 30 while the basket 50 is filled with hot water, the far wall 190 of the brew basket will act on the resting fluid and push the fluid toward the direction of motion, i.e. toward the handle 120. The faster the basket is removed, the more force is applied to the fluid, causing a wave of fluid to be created. If the basket 50 moves at a constant speed, the wave will move with the basket in a state of equilibrium. However, once the basket 50 decelerates the wave will impact the near wall 200 of the basket causing hot water to spill over the wall against the handle, potentially burning the worker. However, in the case of the present invention, the wave enters the splash reservoir 140 and is then separated into smaller waves by the channels 185 defined by the vertical fins 175. The distance that the wave travels to get to the edge of the splash reservoir 140, and the division of the wave into smaller wavelets, greatly attenuates the momentum of the original wave and greatly reduces the likelihood that the wave will spill over the edge of the brew basket. Thus, the splash reservoir 140 provides an area where the energy of the wave created by pulling out a basket with hot water out of the brewing apparatus can attenuate or dissipate safely, leading to a safer environment.

The structure of the splash reservoir 140 provides a convenient location to also mount a splash guard 220, as shown in FIGS. 3 and 5. The splash guard 220 is an overlay that includes a first surface 230 that covers the front edge 165 of the splash reservoir 140 and a second surface 240 that serves as a roof for the splash reservoir. The splash guard 220 has a recess (not shown) to accommodate the handle 120 that is integral with the front edge 165 of the splash reservoir 140, and includes left and right tabs 235 that can snap into mating slots 245 in the side of the splash reservoir, more specifically the side walls 155, to affix the splash guard 220 on the brew basket 50. The splash guard 220 can include designations such as "decaffeinated," "regular," and "iced tea" (as shown in FIG. 1), and other designations to indicate the type of coffee being brewed. The splash guard 220 snaps on and off of the brew basket 50 easily and can be interchanged quickly with other alternate splash guards when needed. To further secure the splash guard, a small notch in the first surface 230 can engage and capture a peg (not shown) formed in the front edge 165 of the splash reservoir to secure the front portion of the splash guard to the brew basket. The overhang from the second surface 240 encloses the splash reservoir 140 and can further assist in preventing liquid from splashing upward when the basket is prematurely removed from the brewing apparatus.

The present invention has been illustrated and described by the use of examples, but the examples are not intended to be limiting. For example, while coffee has been used as an example of the brewed beverage, other beverages such as teas, chais, and the like also are within the scope and use of the present invention. Further, various sizes and shaped of the brew basket and splash reservoir can be altered without departing from the scope of the present invention. Rather, the scope of the present invention is intended to be limited only by the words of the appended claims, using the ordinary and customary meaning for those words without resort to limiting the breadth of those meanings with the illustrations or descriptions herein.

We claim:

1. A brew basket for a brewing apparatus comprising:
   a floor having a substantially centered drain port disposed therein;
   a lip protruding laterally and radially outwardly from an upper surface of the brew basket to form a guide for guiding the brew basket into the brewing apparatus;
   a substantially conical wall extending from the floor to the lip and forming a fluid tight seal with a periphery of the floor to define a brewing compartment, the substantially conical wall defining an interior surface and an exterior surface of the brew basket, and defining a first interior volume of the brew basket;
   a plurality of ribs extending radially and vertically from the drain to the lip;

a splash reservoir extending outwardly from the substantially conical wall to define a second interior volume of the brew basket, the splash reservoir defined by first and second planar walls projecting outwardly from the substantially conical wall and connected by a side wall that is radially spaced from the substantially conical wall, and a splash reservoir floor joining the first and second planar walls along a bottom edge and the side wall along a vertical edge, the side wall, splash reservoir floor, and first and second planar walls forming the splash reservoir defining the second interior volume;

a plurality of fins projecting upwardly from the splash reservoir floor to create channels therebetween, the plurality of fins having a closer circumferential spacing than the plurality of ribs; and an interlocking cover adaptable to engage the brew basket at the splash compartment and cover the splash compartment, the interlocking channel having at least a portion of its structure outside in contact with the exterior surface of the brew basket.

2. The brew basket of claim 1, wherein the splash reservoir floor is configured with an upward slope from a juncture with the conical wall to the side wall.

3. The brew basket of claim 1 wherein the planar walls are parallel to each other.

4. The brew basket of claim 1 wherein the interlocking cover contacts a handle of the brew basket.

5. The brew basket of claim 1 wherein the fins do not extend into the first interior volume.

* * * * *